United States Patent [19]

Okano

[11] Patent Number: 5,623,373
[45] Date of Patent: Apr. 22, 1997

[54] LENS BARREL AND METALLIC MOLD FOR MOLDING THE SAME

[75] Inventor: Hiroshi Okano, Tokyo, Japan

[73] Assignee: Nikon Corporation, Tokyo, Japan

[21] Appl. No.: 597,456

[22] Filed: Feb. 2, 1996

[30] Foreign Application Priority Data

Mar. 3, 1995 [JP] Japan ..................................... 7-044061

[51] Int. Cl.$^6$ ..................................................... G02B 7/02
[52] U.S. Cl. .......................................... 359/819; 359/811
[58] Field of Search .......................... 359/819, 703–704, 359/808, 818, 811

[56] References Cited

U.S. PATENT DOCUMENTS 5,493,452  2/1996  Hoshino ................................. 359/819

Primary Examiner—Georgia Y. Epps
Assistant Examiner—John P. Cornely
Attorney, Agent, or Firm—Oliff & Berridge

[57] ABSTRACT

A lens barrel is formed by a forming process using metallic molds. The mold forms a first lens holding component and a second lens holding component with high accuracy and centered around the same axis by using the same mold component to form the first and second lens holding components. The first and second lens holding components are separated in the axial direction by an abutting component, and adjacent abutting components are separate in a circumferential direction of the lens barrel by a concave component. Each first lens holding component is formed in a concave component. A release component, which has an inner diameter larger than the inner diameter of the first lens holding component, is formed between the first lens holding components in the circumferential direction. Additionally, the molds for molding the lens barrel of this invention are constructed such that a first mold forms the second lens holding component, the abutting joint component, and the first lens holding component. A second metallic mold, which is to form the release component, is inserted into the first metallic mold. Because both the first and second lens holding components are formed by the first mold, any axial shift between the first and second molds does not affect optical performance.

14 Claims, 3 Drawing Sheets

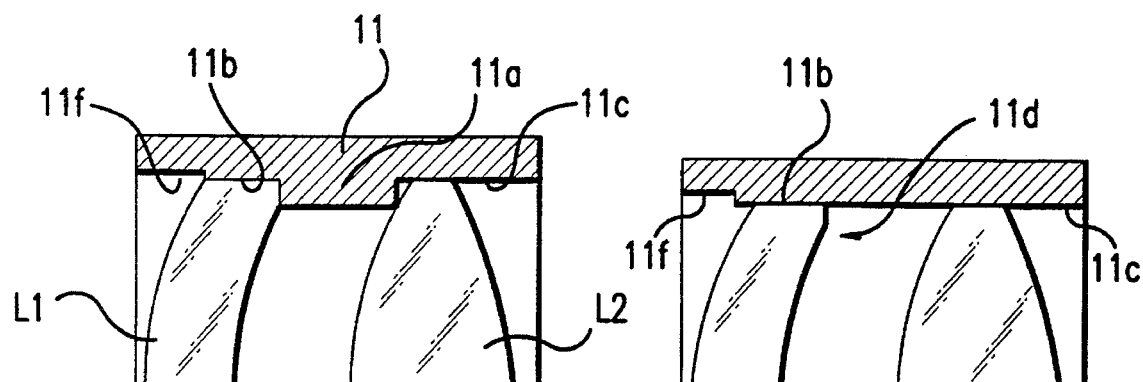
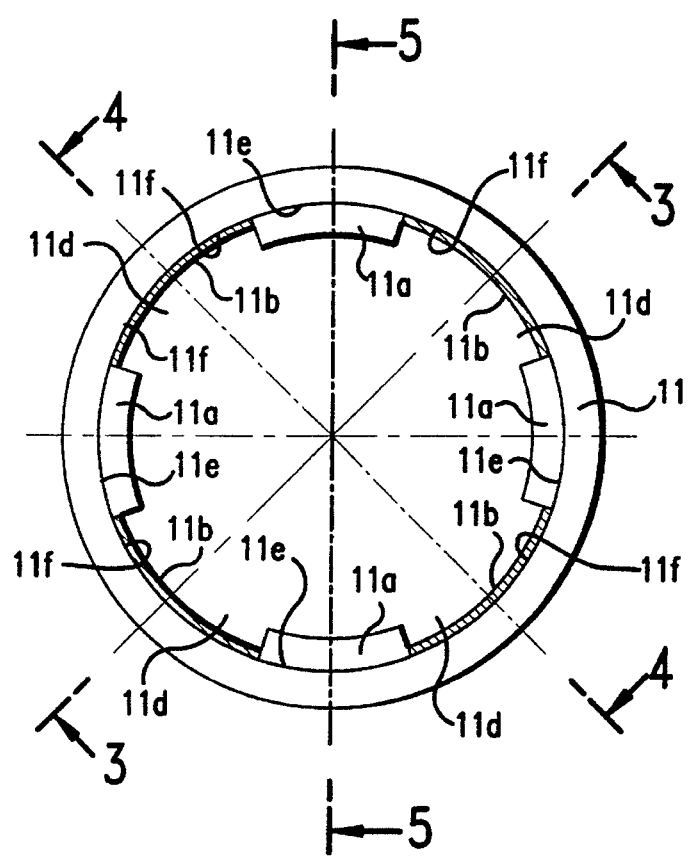

LENS BARREL AND METALLIC MOLD FOR MOLDING THE SAME

BACKGROUND OF THE INVENTION

1. Field of the Invention

This invention concerns a lens barrel configured to hold a lens for a camera or the like. The invention particularly relates to the lens barrel formed by a molding process and a metallic mold for molding the lens barrel.

2. Description of Related Art

FIG. 6 shows a prior art lens barrel. On this lens barrel, a first lens holding component 1b, which holds a lens L1, is formed on one side of an abutting joint component 1a. The abutting joint component 1a is integrally formed around the inner circumference of the cylinder-shaped barrel main body 1. The second lens holding component 1c, which holds lens L2, is formed on the other side of the same abutting joint component 1a. Generally, this type of lens barrel has been formed, for example, from the injection molding of resin, aluminum, or the like.

FIG. 7 shows the metallic mold for molding the aforementioned lens barrel. This metallic mold is made of a core 2 and a cavity 3. The outer circumference 1d of the barrel body, the second lens holding component 1c, and the abutting joint component 1a are formed by the core 2. The first lens holding component 1b is formed by the cavity 3.

However, the prior art device is characterized by insufficient optical performance because the second lens holding component 1c is formed by the core 2 and the first lens holding component 1b is formed by the cavity 3. The lens holding components 1b and 1c are formed with an eccentric condition due to the axis shift of the central axis of the core 2 and the cavity 3. This axis shift causes the lens L1, which is tightly held by the first lens holding component 1b, and the lens L2, which is tightly held by the second lens holding component 1c, to become eccentric, resulting in a loss of optical performance.

SUMMARY OF THE INVENTION

This invention overcomes the problem of insufficient optical performance suffered by the prior art. An embodiment of the lens barrel includes a cylindrical body having abutting joint components formed along its inner circumference. Concave components are also formed along the inner circumference. One concave component is formed between each abutting joint component.

First lens holding components are positioned along the inner circumference. One first lens holding component is positioned on an extension of each concave component on one side of the abutting joint components in the axial direction of the cylindrical body. Second lens holding components are positioned along the inner circumference between each concave component, on another side of the abutting joint components in the axial direction of the cylindrical body.

Additionally, a release component is formed between each of the first lens holding components along the inner circumference. The inner diameter of each release component is greater than an inner diameter of each of the first lens holding components.

In an embodiment of the invention, an inner diameter of each second lens holding component is at least as large as the inner diameter of each first lens holding component.

A mold for forming a lens barrel includes a core component having a space for forming a body of the lens barrel, convex components for forming first lens holding components, and molding components for forming second lens holding components. The mold also includes a cavity component fitting tightly into the core component. The cavity component forms the release component.

In order to form the above described lens barrel with the above described mold, a melted material is injected into the mold. After the material hardens, the core component is separated from the cavity component and the first and second lens holding components are thereby centered around an axis.

BRIEF DESCRIPTION OF THE DRAWINGS

The invention will be described in detail with reference to the following drawings in which like reference numerals refer to like elements and wherein:

FIG. 1 is a cross-sectional view showing a half-portion of one embodiment of the lens barrel of this invention;

FIG. 2 is a side view figure as viewed from the left side showing the lens barrel of FIG. 1;

FIG. 3 is a cross-sectional view showing the portion of the lens barrel along line C—C of FIG. 2;

DETAILED DESCRIPTION OF PREFERRED EMBODIMENTS

Figure 4:
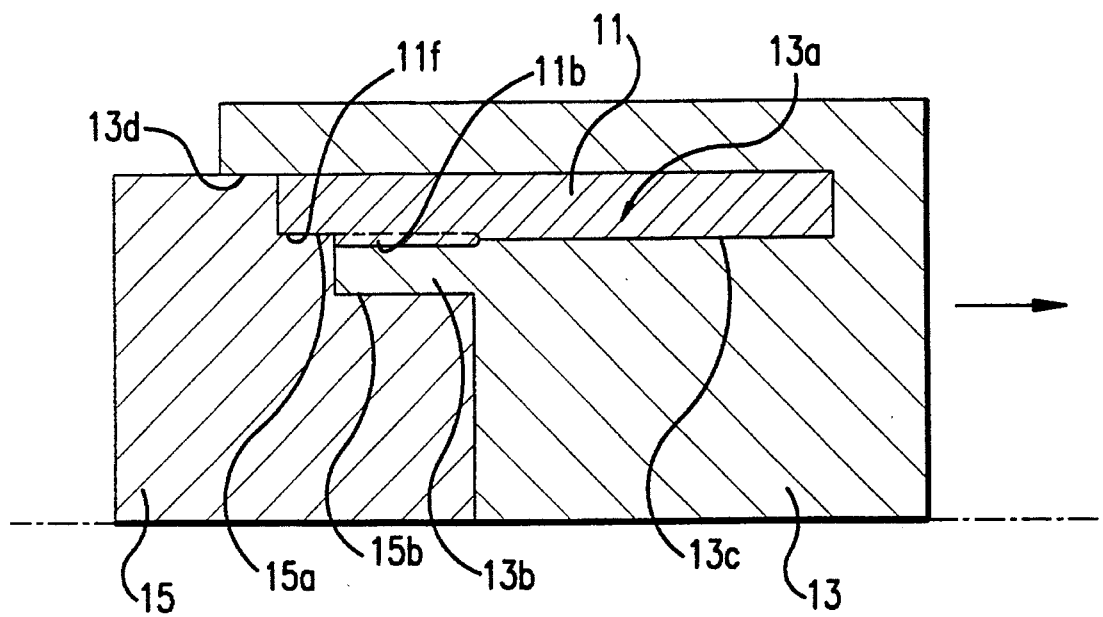
FIG. 4 is a cross-sectional view showing the half-portion of the molding component along the A—A lines of FIG. 2 of the metallic mold for molding to the lens barrel of FIG. 1.

Embodiments of this invention will be explained hereafter with reference to figures.

FIGS. 1 and 2 show an embodiment of the lens barrel of this invention. The cylinder shaped barrel body is made from resin, aluminum, or the like.

Along the inner circumference of the barrel body 11, an annulus ring shaped abutting joint component 11a is integrally formed and protrudes from the inner circumference of the barrel body in four places.

Additionally, the first lens holding component 11b, which tightly holds lens L1, is formed to one side of the abutting joint component 11a in the axial direction of the barrel body; and the second lens holding component 11c, which tightly holds lens L2, is formed to the other side of the abutting joint component in the axial direction of the barrel body.

In this embodiment, the inner diameter of the second lens holding component 11c is the same diameter as the inner diameter of the first lens holding component 11b.

Adjacent the abutting joint component 11a in the circumferential direction of the barrel body, concave components 11d are formed and placed at fixed angles in four places along the inner circumference of the barrel body. The concave components have the same diameter as the inner diameter of the first lens holding component 11b.

FIG. 3 shows a cross-section of the lens barrel along line C—C of FIG. 2. As shown in this figure, the first lens holding component 11b is formed only on the extension of these concave components 11d.

A release component 11e, which has an inner diameter larger than the inner diameter of the first lens holding component 11b, is formed between each of the first lens holding components 11b. This release component 11e helps to fix the lens L1 reliably to the first lens holding component 11b even if there is an axis shift during molding as described below. Additionally, release component 11e makes release of the lens components easier.

Moreover, with this embodiment, a circular step component 11f, which has an inner diameter equal to the inner diameter of the release component 11e, is formed at the edge of each of the first lens holding components 11b, as shown in FIGS. 1–3.

Figure 5:
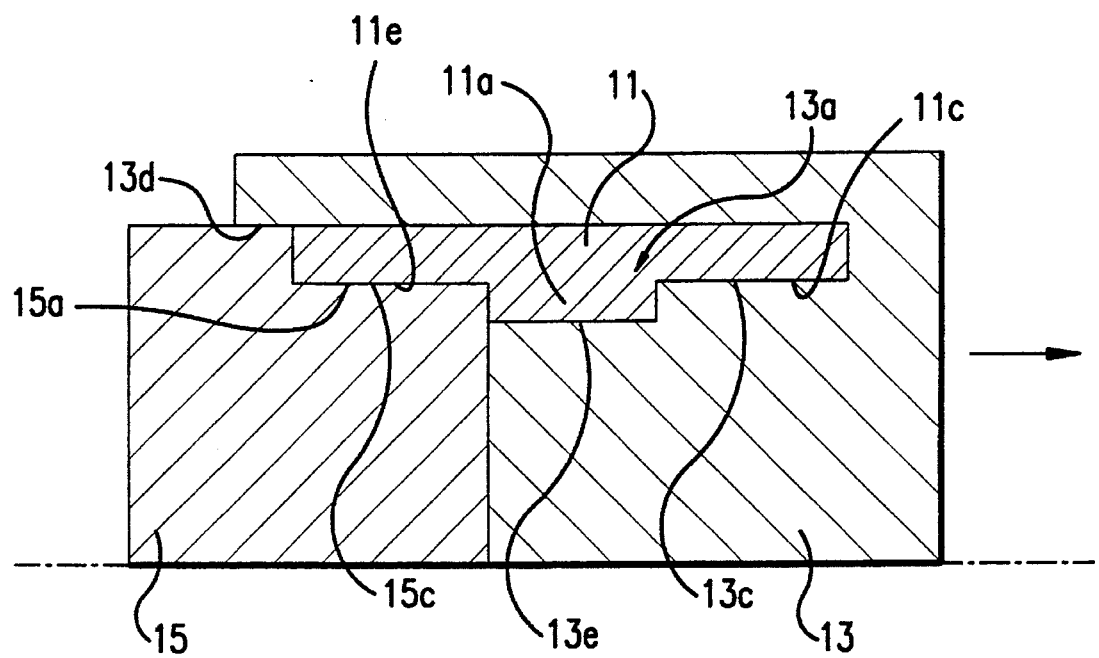
FIG. 5 is a cross-sectional view showing the half-portion of the molding component along the B—B lines of FIG. 2 of the metallic mold for molding the lens barrel of FIG. 1.
Figure 6:
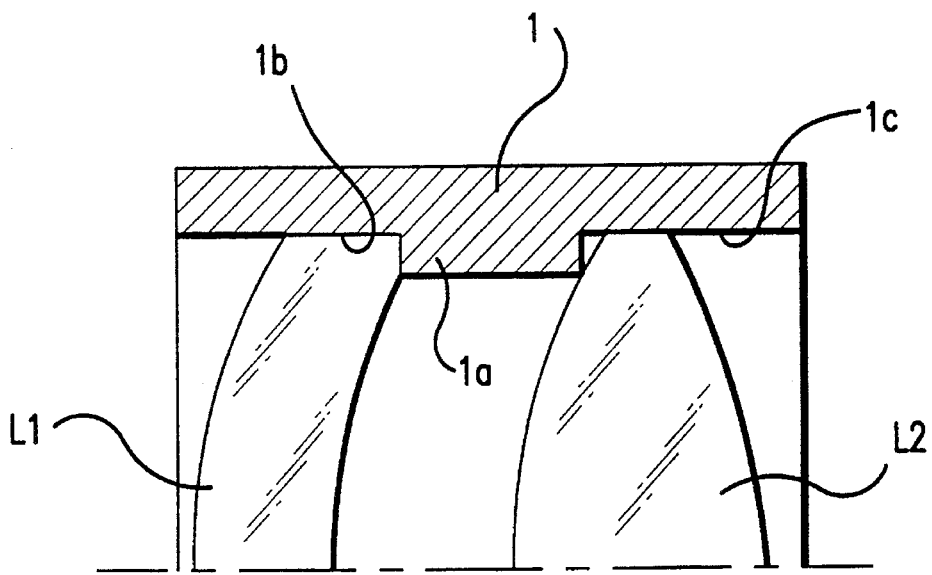
FIG. 6 is a cross-sectional view showing the half-portion of the lens barrel of the prior art.
Figure 7:
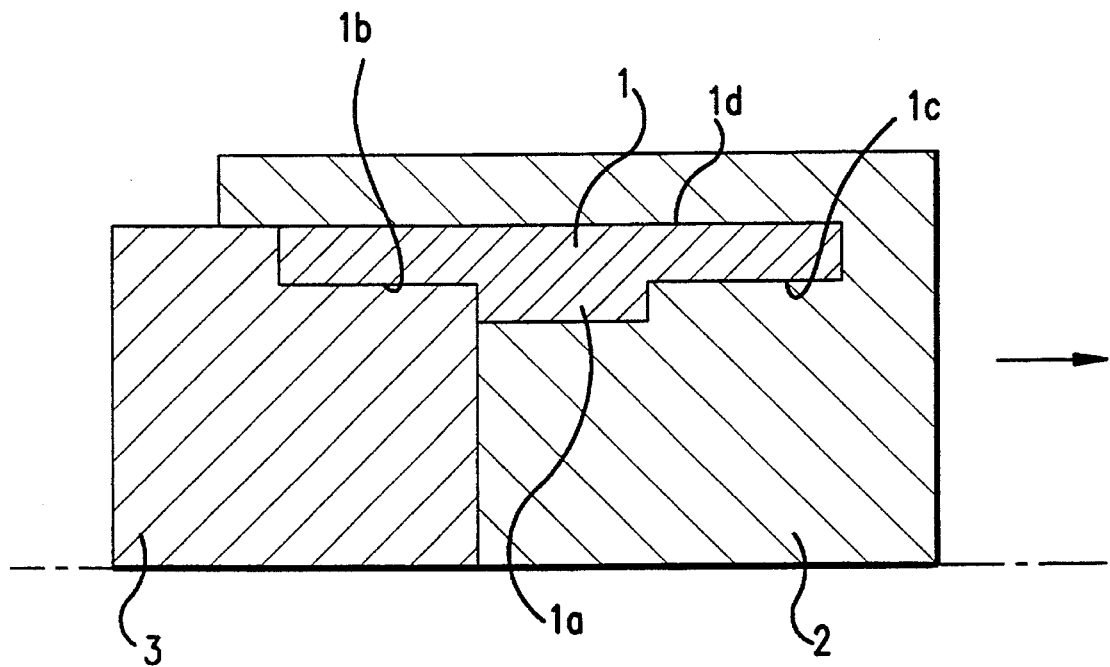
FIG. 7 is a cross-sectional view showing the half-portion of the metallic molds for molding the lens barrel of FIG. 6.

FIGS. 4 and 5 show the metallic mold for lens barrel molding that is used for the molding of the aforementioned lens barrel. FIG. 4 shows the molding component of a cross-section along the A—A line of FIG. 2; and FIG. 5 shows the molding component of a cross-section along the B—B line of FIG. 2.

In these figures, core 13 is the primary metallic mold, and cavity 15 is the secondary metallic mold.

In FIG. 4, the space 13a is formed at the core 13 in order to form the outer circumference of the barrel body 11. The convex component 13b is formed in order to form the first lens holding component 11b at four locations along the inner circumference of the barrel body at fixed angles.

At the position where this convex component exists, the abutting joint component 11a is not formed. Rather, the concave component 11d is formed.

In addition, the molding component 13c forms the second lens holding component 11c.

Additionally, at the core 13, the component 13d into which the cavity 15 is inserted, is formed. At the cavity 15, the molding component 15a forms the step component 11f. Also, at the cavity 15, the component 15b, which is inserted into the convex component 13b of the core 13, is formed.

In FIG. 5, at the core 13, the space 13a is configured to form the outer circumference of the barrel body 11. The molding component 13e is shaped in order to form the abutting joint component 11a that is separated by the concave components 11d. The molding component is formed at four places at fixed angles around the inner circumference of space 13a.

In the position where this abutting joint component 11a exists, the first lens holding component 11b is not formed, but the release component 11e is formed. In addition, the molding component 13c is formed in order to form the second lens holding component 11c. Moreover, at the core 13, the matching member 13d into which the cavity 15 is inserted, is formed. At the cavity 15, the molding component 15c is formed in order to form the step component 15a as well as the release component 11e.

In the aforementioned metallic mold for the molding of the lens barrel, after the cavity 15 is inserted into the matching member 13d of the core 13, elemental materials such as resin, aluminum, or the like are injected in a melted condition from a gate (not shown) that is formed at the core. The elemental materials are injected towards the space 13a. After the elemental material hardens, the lens barrel, which is shown in FIG. 1, can be produced by moving the core 13 in the direction that separates from the cavity 15.

In the lens barrel, which is constructed as mentioned above, the inner diameter of the second lens holding component 11c is the same as that of the first lens holding component 11b. The concave components 11d are formed in four locations. The concave components 11d have the same inner diameter as the first lens holding components 11b. The first lens holding components 11b are formed on only the one side extension of these concave components 11d as shown in FIG. 3.

Accordingly, after formation, it becomes possible to easily remove the core 13, which is integrally formed, from the side of the second lens holding components 11c. It also becomes possible to form the first lens holding components 11b and the second lens holding components 11c by way of the same molding component, that is the integrally formed core 13 forms both the first and second lens holding components.

The result is that even when there is an axis shift of the central axis of the core 13 and the cavity 15, the first lens holding component 11b and the second lens holding component 11c can be formed with high accuracy centered around the same axis because they are formed from the same mold component i.e., the core 13 (unlike the prior art where the first and second lens holding components were formed from separate mold components subject to axial misalignment.) Thereby, the eccentricity that occurs in the lens L1 that is tightly held by the first lens holding components 11b, and in the lens L2 which is tightly held by the second lens holding component 11c, disappears. Thus, the optical performance can be maintained without fail.

Additionally, the release component 11e, which has an inner diameter larger than the inner diameter of the first lens holding components 11b, is formed in between each of the first lens holding components 11b, along the barrel body. Therefore, the lens L1 can be inserted without fail into the first lens holding component 11b even if there is an axis shift between the central axes of the core 13 and the cavity 15 because the larger inner diameter of the release component 11e will not affect the fixation of the lens by the first lens component 11b. Also, because the release component 11e is formed by the cavity 15 (instead of the core 13 which forms both the first and second lens holding components), any axial shift between the core 13 and cavity 15, which results in axial misalignment of the release portion 11e, will not affect optical performance.

In addition, in the metallic mold for the molding of the aforementioned lens barrel, the first and second lens holding components can be formed without fail with the integrally formed core 13. Therefore, the first and second lens holding components can be formed with high accuracy centered around the same axis. Additionally, the release component 11e can be formed without fail by way of the cavity 15.

Moreover, the aforementioned description provides an example in which the inner diameter of the first lens holding components 11b and the second lens holding components 11c are the same. However, this invention is not limited to the application of this particular embodiment. It is also acceptable for the inner diameter of the first lens holding components to have an inner diameter larger than the inner diameter of the second lens holding components.

Additionally, an example has been provided in which the inner diameter of the concave components 11d, which are formed between the abutting joint components 11a, is made to be the same as the inner diameter of the first lens holding component 11b and the second lens holding component 11c. However, it is also acceptable for the concave component 11*d* to have an inner diameter larger than the inner diameter of the first lens holding component 11*b*.

Additionally, the aforementioned embodiment explained an example in which the core 13 and the cavity 15 are joined in a tight fit by way of the matching member 13*d*. However, by making the matching member into a taper, the edge no longer contacts at the time of insertion, and it becomes possible for the core 13 and the cavity 15 to be more easily joined.

As explained above, in an embodiment of the disclosed lens barrel after formation, it becomes possible for the mold component that forms both the first lens holding component and the second lens holding component to be more easily removed. The first metallic mold, which is integrally formed, molds both the first lens holding components and the second lens holding components.

The result is that even when there is an axis shift of the central axis of the first metallic mold and the second metallic mold, the first and second lens holding components can be formed with high accuracy centered around the same axis; and the eccentricity which occurs in the lens L1, which is held by the first lens holding component 11*b*, and in the lens L2, which is held by the second lens holding component 11*c*, disappears; and the optical performance can be maintained without fail.

Additionally, even when there is an axis shift of the central axis of the first metallic mold and the second metallic mold, the lens can be inserted without fail into the first lens holding component because the release component, which has an inner diameter larger than the inner diameter of the first lens holding component, is formed in between the first lens holding components along the inner diameter of the barrel body.

In an embodiment of the metallic mold for the molding of the lens barrel, the second lens holding component as well as the first lens holding component can be formed by way of the first integrally formed metallic mold. The first and second lens holding components can be formed with high accuracy centered around the same axis.

Additionally, the mold of the present invention is advantageous because of the ability to form the release component without fail by way of the second metallic mold.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A lens barrel comprising:

a cylindrical body defining an axis and having an inner circumference;

abutting joint components formed along the inner circumference;

concave components formed along the inner circumference, each said concave component formed between each said abutting joint component in a circumferential direction of the cylindrical body;

first lens holding components, each said first lens holding component positioned along the inner circumference on each concave component on one side of the abutting joint components in an axial direction of the cylindrical body;

second lens holding components, each said second lens holding component positioned along the inner circumference between each concave component, on another side of the abutting joint components in the axial direction of the cylindrical body; and a release component formed between each of said first lens holding components along the inner circumference, wherein an inner diameter of each said release component is greater than an inner diameter of each of said first lens holding components.

2. The lens barrel of claim 1, wherein an inner diameter of each of said second lens holding components is at least as large as the inner diameter of each of said first lens holding components.

3. The lens barrel of claim 1, wherein an inner diameter of each said concave component is equal to the inner diameter of each of said first lens holding components and an inner diameter of each of said second lens holding components.

4. The lens barrel of claim 1, wherein an inner diameter of each said concave component is greater than the inner diameter of each of said first lens holding components.

5. The lens barrel of claim 1, further comprising a circular step component formed at an edge of each of said first lens holding components.

6. A mold for forming a lens barrel, the mold comprising:

a core component comprising, a space for forming a body of the lens barrel, convex components for forming first lens holding components, and molding components for forming second lens holding components; and a cavity component fitting tightly into the core component, the first and second lens holding components being formed only by the core component.

7. The mold of claim 6, wherein the core component further comprises additional molding components, each of said additional molding components for forming an abutting joint component located between the first and second lens holding components in an axial direction of the lens barrel.

8. The mold of claim 6, wherein the cavity component comprises portions shaped to form release components, each release component having an inner diameter larger than an inner diameter of each first lens holding component, and each release component being located on an inner circumference of the lens barrel between the first lens holding components.

9. The mold of claim 6, wherein the core component is shaped such that an inner diameter of each of the second lens holding components is at least as large as an inner diameter of each of the first lens holding components.

10. The mold of claim 6, wherein the core component is shaped such that an inner diameter of each of the first lens holding components is larger than an inner diameter of each of the second lens holding components.

11. The mold of claim 6, wherein the cavity component comprises a portion for forming a circular step component.

12. A method for forming a lens barrel with a mold, the method comprising:

providing a metallic mold comprising a core component and a cavity component, said core component having, a space for forming a body of the lens barrel, convex components for forming first lens holding components, and molding components for forming second lens holding components;

inserting the cavity component into the core component;

injecting a melted material into the mold such that the first and second lens holding components are formed only by the core component; and separating the core component from the cavity component.

13. The method of claim 12, wherein the step of providing the core component comprises providing additional molding components for forming abutting joint components between the first and second lens holding components in an axial direction of the lens barrel; and the step of providing the cavity component comprises providing portions shaped to form release components, each release component having an inner diameter larger than an inner diameter of each first lens holding component, and each release component being located on an inner circumference of the lens barrel between the first lens holding components.

14. The method of claim 12, wherein providing the cavity component comprises providing portions for forming circular step components.

* * * * *